(12) United States Patent
Van Veen et al.

(10) Patent No.: US 12,088,439 B1
(45) Date of Patent: Sep. 10, 2024

(54) PHASED BURST MODE RECEIVER EQUALIZATION TRAINING

(71) Applicant: Nokia Solutions and Networks Oy, Espoo (FI)

(72) Inventors: Doutje Van Veen, New Providence, NJ (US); Vincent Houtsma, New Providence, NJ (US)

( * ) Notice: Subject to any disclaimer, the term of this patent is extended or adjusted under 35 U.S.C. 154(b) by 0 days.

(21) Appl. No.: 18/125,225

(22) Filed: Mar. 23, 2023

(51) Int. Cl.
*H04L 25/03* (2006.01)
*H04B 10/2575* (2013.01)

(52) U.S. Cl.
CPC . *H04L 25/03878* (2013.01); *H04B 10/25759* (2013.01); *H04L 25/03006* (2013.01); *H04L 2025/03815* (2013.01)

(58) Field of Classification Search
CPC . H04L 25/03057; H04L 7/033; H04L 5/0007; H04L 5/0044; H04L 1/0071; H04L 2001/0093; H04L 27/2647; H04L 25/03343; H04W 36/005; H04W 36/0066; H04W 88/06; H04W 16/26; H04W 36/02; H04W 72/0446; H04W 72/23; H04W 36/14; H04B 10/272; H04B 10/27; H04B 10/2507; H04B 10/2575; H04B 10/516; H04B 10/25751; H04B 10/40; H04B 10/5161
USPC ......................................................... 375/262
See application file for complete search history.

(56) References Cited

U.S. PATENT DOCUMENTS

| | | | | |
|---|---|---|---|---|
| 7,542,506 | B2* | 6/2009 | Yamaguchi | H04L 25/03885 375/354 |
| 2005/0019042 | A1* | 1/2005 | Kaneda | H04L 25/03057 398/208 |
| 2009/0103922 | A1* | 4/2009 | Lee | H04J 14/0282 398/72 |
| 2018/0302183 | A1* | 10/2018 | Liu | H04J 14/0282 |
| 2022/0069904 | A1* | 3/2022 | Lee | H04B 10/07955 |

OTHER PUBLICATIONS

Li Guoqiang et al., "Performance Assessments of Joint Linear and Nonlinear Pre-Equalization Schemes in Next Generation IM/DD Pon", Journal of Lightwave Technology, IEEE, USA, vol. 40, No. 16, Jun. 7, 2022, pp. 5478-5489.

(Continued)

*Primary Examiner* — Eva Y Puente
(74) *Attorney, Agent, or Firm* — Capitol Patent & Trademark Law Firm, PLLC

(57) ABSTRACT

A phased approach to training of an upstream burst mode receiver equalizer is disclosed that proceeds incrementally through modulation schemes requiring increasing levels of equalization in a manner where the equalizer maintains the capability to accurately recover data transmitted during each training phase. The phased approach includes an initial training phase (one or more upstream bursts) using a simple modulation format, one or more intermediate phases of different modulation schemes, and a final training phase using the PON-defined (high) line rate upstream modulation format. Equalizer settings generated during the initial phase are used as a starting point for the equalization process in the next training phase, and so on, until the equalizer training reaches the final phase where the ONU uses the PON-defined upstream data rate and the burst mode equalizer is updated accordingly.

20 Claims, 7 Drawing Sheets

(56) References Cited

OTHER PUBLICATIONS

Houstsma, Vincent E. et al., "Investigation of Modulation Schemes for Flexible Line-Rate High-Speed TDM-PON", Journal of Lightwave Technology, IEEE, USA, vol. 38, No. 12, Feb. 28, 2020, pp. 3261-3267.
European Search Report dated Jul. 12, 2024.

* cited by examiner

PHASED BURST MODE RECEIVER EQUALIZATION TRAINING

TECHNICAL FIELD

Embodiments of the present disclosure are generally related to the field of passive optical networks (PONs) and, more specifically, to the provision of receiver equalization training for devices receiving high line rate burst mode communications.

BACKGROUND

Newer generations of passive optical networks will be based upon a transmission rate of 50 Gb/s ("50G"). The developing standards for a 50G PON presume the use of a receiver configuration that includes some type of electronic equalization (digital signal processor (DSP)-based, for example) that will compensate for network impairments and noise, as well as the response limitations of standard photodiodes that provide the initial conversion from a received 50G optical signal into an electrical equivalent.

At the proposed upstream line rate of 50G (and, eventually, higher line rates), the burst mode receiver at an optical line terminal (OLT) needs to quickly equalize the upstream bursts it receives from an optical network unit (ONU) before data can be accurately recovered. While there exist techniques for training a burst mode OLT receiver to compensate for the impaired response associated with the reception of 50G transmissions, they require a relatively long time interval (and several iterations) to develop the proper equalization characteristics. Since the equalizer configuration is under constant update and not yet optimal during this training period, accurate reception of the transmitted data from the ONU to the OLT is not possible until the equalizer training process is fully completed.

SUMMARY

Disclosed is a phased approach to training of an upstream burst mode receiver equalizer that proceeds incrementally through different modulation schemes from a basic format requiring little, if any, equalization to the final modulation scheme used by the PON network in which an ONU will be operating. Between these two extremes (also referred to here as an "initial" phase and a "final" phase) is one or more intermediate phases that utilizes a modulation scheme that requires more equalization than the initial phase, but not yet at the level required for the final phase associated with the transmission system (e.g., currently 50G standard). For example, an intermediate phase may use the same data rate as the initial phase, but employ a modulation format that is more complicated (e.g., using Miller encoding instead of conventional NRZ). Other modifications can be used for the one or more intermediate phases, as long as a receiver will need to update its equalizer for each phase in order to properly decode the transmitted data. For present purposes, the updates may be thought of in terms of increasing the value of the tap weights within the equalizer, increasing the number of individual taps used to perform the equalization, or a combination of both).

For the explanatory purposes of this disclosure, the phrase "modulation scheme" is defined as a particular combination of data rate (e.g., 25G, 50G, etc.) and modulation formation (e.g., NRZ, Miller, PAM4, etc.) utilized by an ONU to transmit data to an OLT burst mode receiver.

Equalizer (filter) settings generated during the initial phase are used as a starting point for the equalization process in the next (intermediate) training phase, with the final values derived in the intermediate phase used as the starting point for the next training phase and so on, until the equalizer training reaches the final phase where the ONU uses the PON-defined upstream modulation format and data rate and the burst mode equalizer is updated accordingly. By virtue of using less complicated modulation formats and/or data rates in the initial and intermediate training phases, the equalization process at these phases takes little time. Indeed, the phased approach may even reduce the overall time period required to complete equalizer training than a conventional prior art approach.

It is an aspect of the disclosed phased equalization process that actual customer data may be transmitted as the payload throughout the entire training process, since the configuration of the burst mode equalizer properly receives the modulation scheme used at all times within each training phase in a manner that maintains the bit error rate (BER) below a defined value.

An example embodiment of this disclosure may take the form of an apparatus for use by an OLT in a PON, where the OLT is communicatively connected to one or more ONUs and the PON is configured to support upstream burst mode transmissions from the ONUs at a defined high upstream line rate. In this example embodiment, the apparatus includes at least one memory including instructions, and at least one processor configured to execute the instructions and cause the apparatus to perform phased training of an OLT burst mode receiver equalizer with respect to a new ONU. The phased training including: performing an initial phase of equalizer training based on a first upstream burst received from the new ONU (the first upstream burst transmitted using an initial low line rate modulation scheme) where the initial phase of equalizer training creates an initial group of equalizer settings; beginning with the initial group of equalizer settings, performing an intermediate phase of equalizer training based on one or more subsequently received upstream bursts from the new ONU transmitted using a different modulation scheme requiring additional receiver equalization (the intermediate phase of equalizer training creating an updated group of equalizer settings); and beginning with the updated group equalizer settings, performing a final phase of equalizer training based on a received upstream burst from the new ONU transmitted using a final modulation scheme based on the defined high upstream line rate, the final phase of equalizer training creating a final group of equalizer settings for continued use by the OLT burst mode receiver equalizer with the new ONU.

An example embodiment may also be directed to an apparatus for use by an ONU operating in a PON supporting burst mode upstream transmissions at a defined high upstream line rate, wherein the ONU communicatively connected an OLT burst mode receiver. In this example embodiment, the apparatus comprises: at least one memory including instructions; and at least one processor configured to execute the instructions and cause the ONU apparatus to perform phased training of an OLT burst mode receiver equalizer based on a sequence of burst mode transmissions from the ONU. The ONU apparatus performing the following steps, including: defining an initial modulation format for use in a first burst mode upstream transmission to the OLT burst mode receiver, the defined initial modulation format based on an initial low line rate modulation scheme, with the first burst mode transmission including a training sequence in an overhead portion of the transmission; transmitting the first burst mode transmission to the OLT burst mode receiver for performing an initial phase of receiver equalizing training; updating the modulation scheme of a subsequent burst mode transmission to a modulation scheme requiring additional equalization at the OLT receiver; transmitting the subsequent burst mode transmission to the OLT receiver for performing an intermediate phase of receiver equalizing training; updating the modulation scheme of a further burst mode transmission to the defined high line rate modulation scheme supported by the PON and requiring additional equalization at the OLT receiver; and transmitting the further burst mode transmission to the OLT receiver for performing a final phase of receiver equalizing training.

Yet another embodiment may take the form of a method for use by an OLT communicatively connected to a plurality of ONUs within a PON, with one or more high-rate ONUs operating at a predefined high upstream line rate, where the method is utilized during a phased process for training an OLT burst mode receiver equalizer to accurately recover data transmitted by a new ONU. The phased process for training the equalizer comprising: performing an initial phase of equalizer training based on a first upstream burst received from the new ONU, the first upstream burst transmitted using an initial low line rate modulation scheme, and the initial phase of equalizer training creating an initial group of equalizer settings; beginning with the initial group of equalizer settings, performing an intermediate phase of equalizer training based on one or more subsequently received upstream bursts from the new ONU transmitted using a different modulation scheme requiring additional receiver equalization, the intermediate phase of equalizer training creating an updated group of equalizer settings; and beginning with the updated group equalizer settings, performing a final phase of equalizer training based on a received upstream burst from the new ONU transmitted using a final modulation scheme based on the defined high upstream line rate, the final phase of equalizer training creating a final group of equalizer settings for continued use by the OLT burst mode receiver equalizer with the new ONU.

A further example embodiment may be a process used by an ONU communicatively connected to an OLT in a PON supporting a defined high line rate upstream burst mode transmission. In this example, the process is used by an ONU during a phased process for training an OLT burst mode receiver equalizer to accurately recover data transmitted by the ONU, and includes the steps of: defining an initial modulation format for use in a first burst mode upstream transmission to the OLT burst mode receiver, the defined initial modulation format based on an initial low line rate modulation scheme, with the first burst mode transmission including a training sequence in an overhead portion of the transmission; transmitting the first burst mode transmission to the OLT burst mode receiver for performing an initial phase of receiver equalizing training; updating the modulation scheme of a subsequent burst mode transmission to a modulation scheme requiring additional equalization at the OLT receiver; transmitting the subsequent burst mode transmission to the OLT receiver for performing an intermediate phase of receiver equalizing training; updating the modulation scheme of a further burst mode transmission to the defined high line rate modulation scheme supported by the PON and requiring additional equalization at the OLT receiver and, lastly, transmitting the further burst mode transmission to the OLT receiver for performing a final phase of receiver equalizing training.

Other features and advantages of the disclosed phased training of burst mode receivers will also become apparent from the following description of example embodiments when read in conjunction with the accompanying drawings, which illustrate, by way of example, the principles of embodiments of the disclosure.

BRIEF DESCRIPTION OF THE DRAWINGS

Referring now to the drawings.

DETAILED DESCRIPTION

The latest passive optical network (PON) standards that have been proposed feature a 50 Gb/s ("50G") line rate. At this speed, digital signal processing in the form of equalization is required at the receiver end to compensate for the effects of chromatic dispersion through the network, as well as the bandwidth-limited responsivity of the receiver components. For upstream burst mode transmissions from optical network units (ONUs) to an optical line terminal (OLT), this means that the OLT burst mode receiver needs to equalize the upstream bursts before the data can be accurately recovered. During a conventional training process for the burst mode equalizer, it is not possible to ensure the accurate reception of data at the OLT receiver; thus, the need for a relatively long training window means there is an extended period of time where reliable data transmission is not possible. A phased process is proposed in this disclosure for OLT receiver training that allows for recovery of data during the entire training process.

Figure 1:
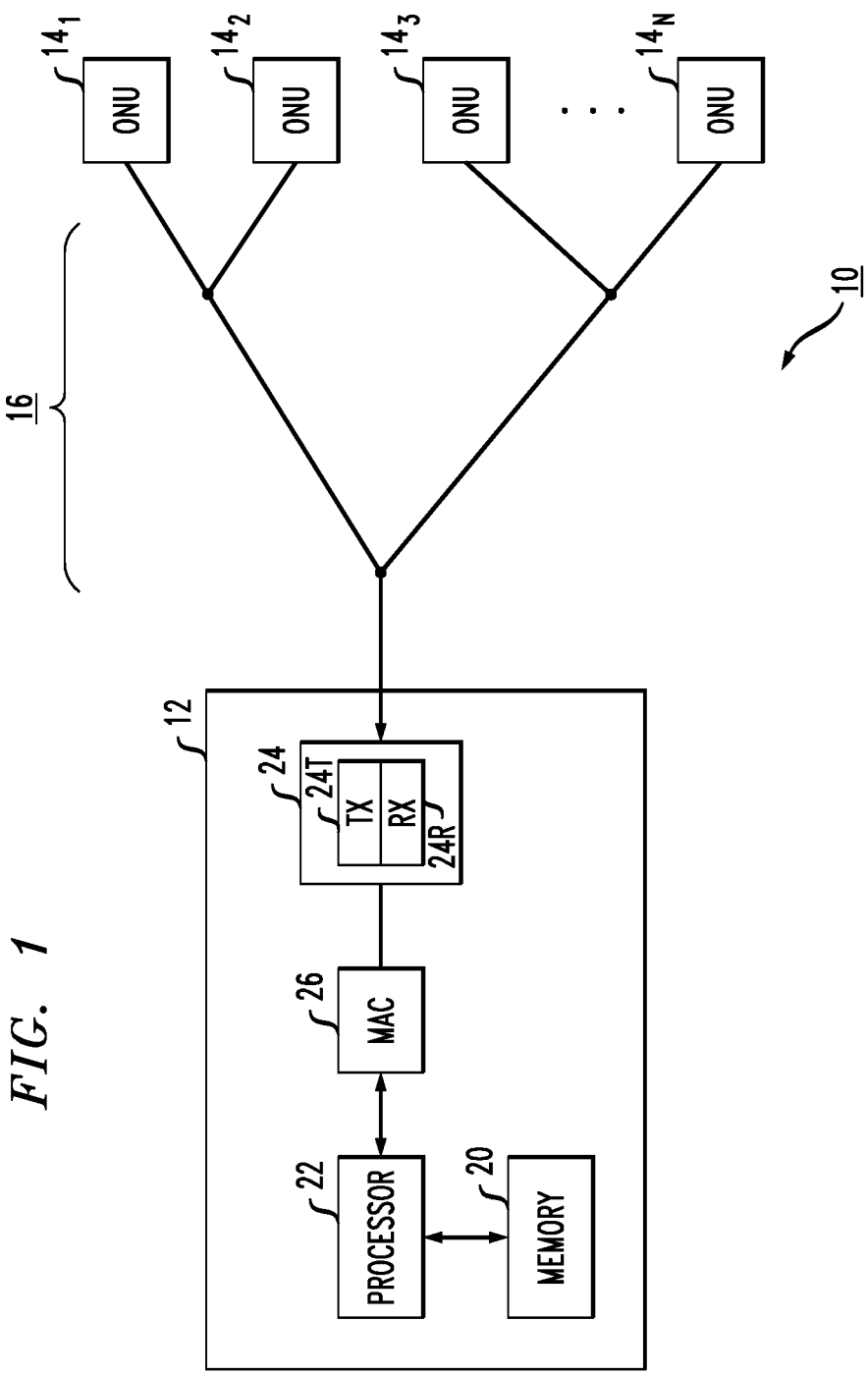
FIG. 1 shows an example architecture of a passive optical network within which the phased training of an OLT burst mode receiver equalizer may be used.

FIG. 1 shows an example architecture of a passive optical network (PON) 10, including an OLT 12 that communicates with a plurality of ONUs 14 via a tree-and-branch type of optical distributed network (ODN) 16. In the downstream direction, the passive splitters within ODN 16 divide the optical transmission from OLT 12 in a manner that broadcasts the same message to the plurality of ONUs 14. In the upstream direction, these same passive devices within ODN 16 are used to direct burst mode transmissions from ONUs 14 to OLT 12.

OLT 12 is shown in this example as including a memory 20, a processor 22, a transceiver 24, and a media access controller (MAC) 26. Memory 20 may store computer readable instructions for operating OLT 12, as well as the information to be sent to ONUs 14 or information received from the ONUs. Processor 22 may control OLT 12 (including memory 20, transceiver 24, and MAC 26) based on executing instructions stored in memory 20. Transceiver 24 includes a transmitter 24T and a receiver 24R, where the details of receiver 24R are most relevant to the present subject matter and are further particularized in the drawing of FIG. 2.

Figure 2:
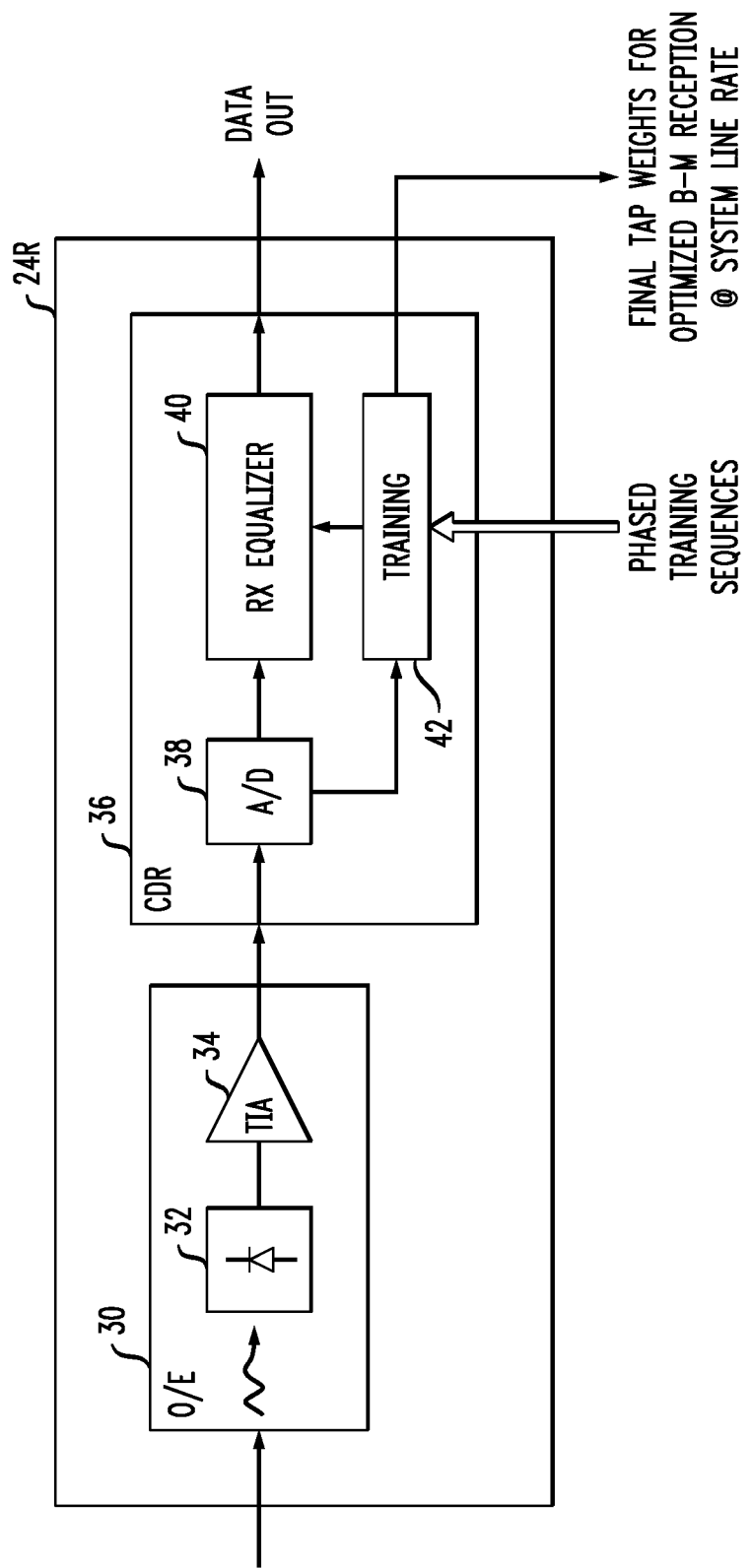
FIG. 2 is a more detailed illustration of an example OLT burst mode receiver including an equalizer component.

Turning now to FIG. 2, OLT burst mode receiver 24R is shown as including an O/E component 30 with a photodiode 32 used to convert the received optical transmission into an electrical equivalent (with a following transimpedance amplifier circuitry (TIA) 34 perhaps included as part of O/E component 30). The electrical output from TIA 34 is thereafter applied as an input to a clock and data recovery (CDR) module 36. In this example, CDR module 36 includes an A/D converter 38 for digitizing the received analog signal from TIA 34. The digital output from A/D converter 38 is then applied as an input to both a receiver equalizer 40 (which includes a DSP-based equalizer circuit, not shown) and an equalizer training module 42.

During the training of equalizer 40, a known "training sequence" is included in the overhead of an upstream burst received from an ONU 14i. In one embodiment, training module 42 itself may have access to the original version of the training sequence (perhaps stored in memory 20 of OLT 12), and performs a comparison between the known training sequence and received sequence (using capabilities of processor 34, for example). In another embodiment, the equalization is performed using the statistics of the transmitted signal itself (referred to at times as "blind equalization"). Regardless of the specific technique that is utilized, the result is that training module 42 creates a series of filter settings (e.g., tap weights for a DSP-based filter) for equalizer 40 that compensates for the distortions in the received version of the training sequence and allows for a properly-configured equalizer 40 to generate the recovered data as an output.

While this is a rather simplified explanation of receiver equalization and the use of equalizer training, it highlights aspects of interest to phased equalizer training as proposed in the present disclosure. As used in this context, "phased equalizer training" describes a multi-step process of performing OLT burst mode receiver equalization by incrementally changing the modulation scheme and updating the tap weight values required in equalizer 40 (by changing one or more parameters of the modulation scheme—either the data rate, the modulation format, or perhaps both). The incremental changes in modulation scheme are performed by the ONU in a controlled manner with sequential upstream burst mode transmissions until reaching the PON-defined (high) modulation data rate. As mentioned above, the use of increased line rates (e.g., 50G and higher) within these passive optical networks requires advanced signal processing to be performed within the receivers to properly mitigate for effects such as chromatic dispersion along the fiber span between the ONU and OLT, as well as the responsivity limitations in the O/E conversion at the receiver input, result in the need to utilize receiver equalization at the OLT for accurate data recovery. The disclosed phased equalization process is considered to be a preferred approach for training an OLT burst mode receiver in those networks supporting upstream burst mode transmission rates of 50G or higher.

For the explanatory purposes of this disclosure, the phrase "modulation scheme" is defined as a particular combination of data rate (e.g., 25G, 50G, etc.) and modulation formation (e.g., NRZ, Miller, PAM4, etc.) utilized by an ONU to transmit data to an OLT burst mode receiver.

Figure 3:
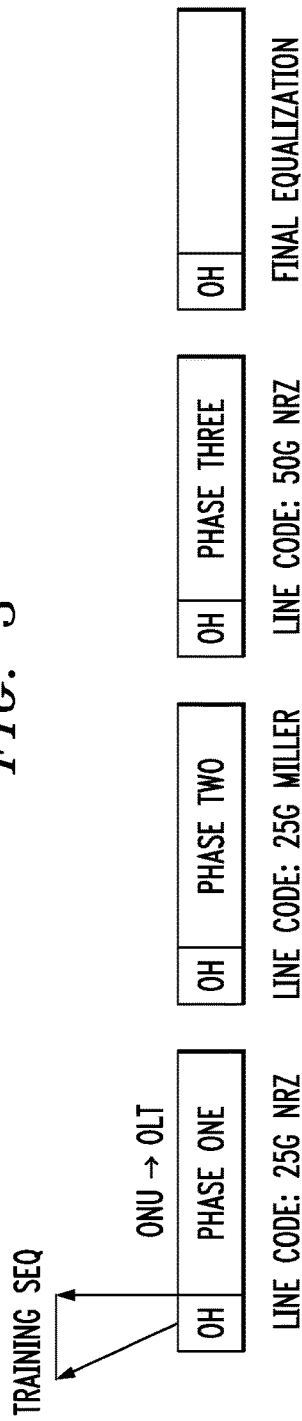
FIG. 3 is a diagram outlining one example of the disclosed phased training process for an OLT burst mode receiver equalizer to successfully recover data from a high line rate upstream burst mode transmission.

FIG. 3 is a diagram outlining one example of the disclosed phased training process for an OLT burst mode receiver equalizer. This particular example is directed to a phased process for training an OLT burst mode receiver equalizer to receive a PON-defined 50G upstream burst mode transmission. As shown, a phased equalization training process begins when a given ONU 14i transmits a first upstream burst to OLT 12 using a simple modulation format transmitted at a relatively low data rate. Data rates of 25G or even 12.5 are suitable for use in the initial training phase. In this example, the initial upstream burst is transmitted using the 25G NRZ modulation format. The initial burst includes a predefined training sequence in the overhead portion of the transmission. Shown in FIG. 3 as "phase one" and described at times going forward as the "initial phase" of the disclosed receiver equalization process, the use of a 25G NRZ modulation scheme is easily handled by an OLT burst mode receiver (such as OLT receiver 24R shown in FIGS. 1 and 2) with little or no need for equalization. Any required equalization (i.e., settings for the receiver's equalizer) will be maintained as the starting point for the equalizer design in the next phase of equalizer training. The example phased training process as shown in FIG. 3 continues with a second, intermediate phase (shown as "phase two" in FIG. 3), where ONU 14i transmits a second upstream burst using an intermediate transmission configuration that requires some equalization to be performed at the receiver to properly recover the transmitted data. For example, the selected intermediate form may use a higher data rate than used in the initial phase (e.g., if 12.5G had previously been used, an increase to 25G is suitable), or a different modulation format may be used (e.g., a modulation that is based on a higher rate of transitions in the transmitted signal), or any combination of these parameters that requires the equalizer to update (increase) its tap settings. For present purposes, the changes in upstream transmission format are considered to require a monotonically increasing level of equalization to be required from one phase to the next.

One possible modulation scheme to use in this second phase may maintain the same line rate as used in the initial phase (e.g., 25G), but use a modulation format that is slightly more complicated than NRZ by introducing a higher rate of transitions (for example, at 50G) within the transmitted signal. A delay encoding scheme, such as Miller encoding, is one possibility. Since Miller encoding requires a clock running at twice the code rate to properly recover the transmitted data (since it consists of higher rate transitions as mentioned above), a more complicated equalizer configuration, closer in form to the one ultimately required for the defined 50G NRZ signals will be necessary.

In response to the 25G Miller upstream burst received by OLT burst mode receiver 24R in the second training phase, training module 42 again utilizes the received training sequence (in the overhead of the burst) to create updated equalizer settings (tap weights) to compensate for the increase in transmission distortions. In this second phase, training module 42 begins the equalization process with the set of equalizer settings (if any) developed during the initial training phase, updating the settings to properly compensate for the additional distortion. Once the burst mode equalizer is fully configured at this intermediate phase, the equalizer settings are saved for use as the starting point for the next phase of equalizer training.

In this particular example of FIG. 3, the following phase ("phase three") is the final phase where ONU 14*i* uses the PON-defined (high) 50G line rate for its burst mode upstream transmission. Again, training module 42 begins with the final equalizer settings created during the previous training phase and iteratively performs the updates necessary to arrive at a equalization configuration (e.g., a set of tap weights for its digital filter) that allow for the burst mode upstream data transmitted at the 50G rate to be recovered with an error rate less than a defined value.

For this example of ultimately supporting 50G NRZ upstream traffic and using an initial phase modulation scheme of 25G NRZ, the incremental increase in modulation scheme is selected such that the equalizer shape evolves smoothly in the intermediate phase(s) between the shape associated with the initial 25G NRZ and that associated the final, PON-defined 50G NRZ modulation scheme. This monotonically increasing transition in modulation scheme allows for the training to progress smoothly through the three phases. As noted above, Miller encoding is one modulation format that satisfies this requirement by introducing 50G transitions while still maintaining most of the 25G NRZ properties. It is to be understood, however, that other modulation formats, such as Manchester encoding may be used as well in this second, intermediate phase of the equalizer training process.

Figure 4:
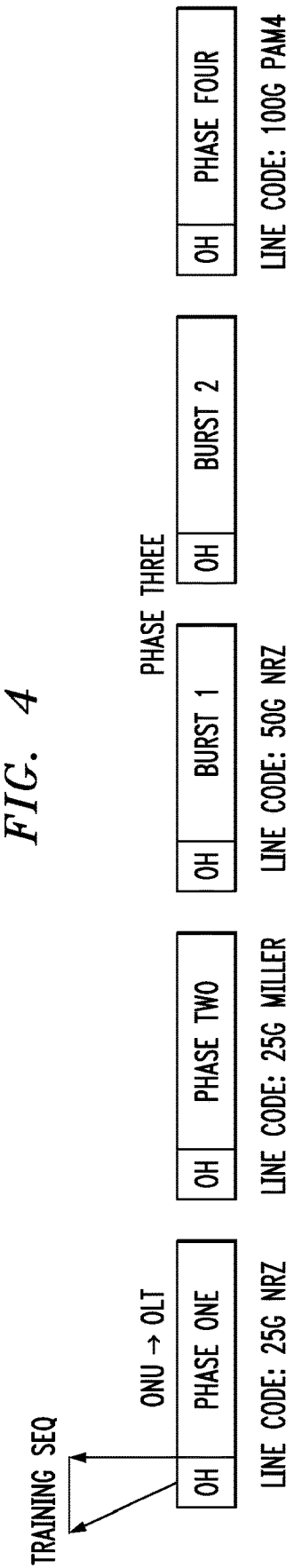
FIG. 4 illustrates another example of phased training in accordance with the present disclosure, in this case to ultimately configure an OLT burst mode receiver equalizer to handle upstream burst mode transmission using a higher line rate than the diagram of FIG. 3.

FIG. 4 illustrates another example of phased training in accordance with the present disclosure, in this case to ultimately configure an OLT burst mode receiver equalizer to handle upstream burst mode transmission using a 100G PAM4 modulation scheme. Similar to the phase process outlined in FIG. 3, the training begins with an initial phase using 25G NRZ burst mode upstream transmission(s), following with a second (intermediate) phase using 25G Miller-encoded burst mode transmission(s). For the case of ultimately reaching 100G PAM4, a following intermediate training phase may have the ONU transition to the 50G NRZ modulation scheme in its next burst mode upstream transmission. Once the equalizer is trained for this 50G NRZ modulation scheme, the next burst mode transmission received from the ONU uses the PON-defined final 100G PAM4 modulation scheme. Again, the equalizer settings developed during the previous training phase are used as the starting point for improving the equalizer response within the burst mode receiver equalizer. In this particular example as shown in FIG. 4, a pair of upstream burst mode transmissions in the 100G PAM4 modulation scheme are required to fully characterize the equalizer. Again, it is an advantage of the phased process that the transmission of actual customer data is supported during the training process.

Receiver equalization training is a task that may immediately follow the activation of a new ONU joining an existing PON. In the present context of considering a 50G PON, an activation process has been proposed by the identified applicant that is based on using a relatively low upstream line rate to transmit activation messages to the OLT. It is contemplated that one embodiment of the present disclosure may use this same activation process modulation scheme for the initial phase of receiver equalization training. Indeed, a 25G NRZ modulation scheme has been found acceptable for use in both activation and the initial equalizer training phase (this being only one example; a 12.5G NRZ is another alternative for both processes as well).

Figure 5:
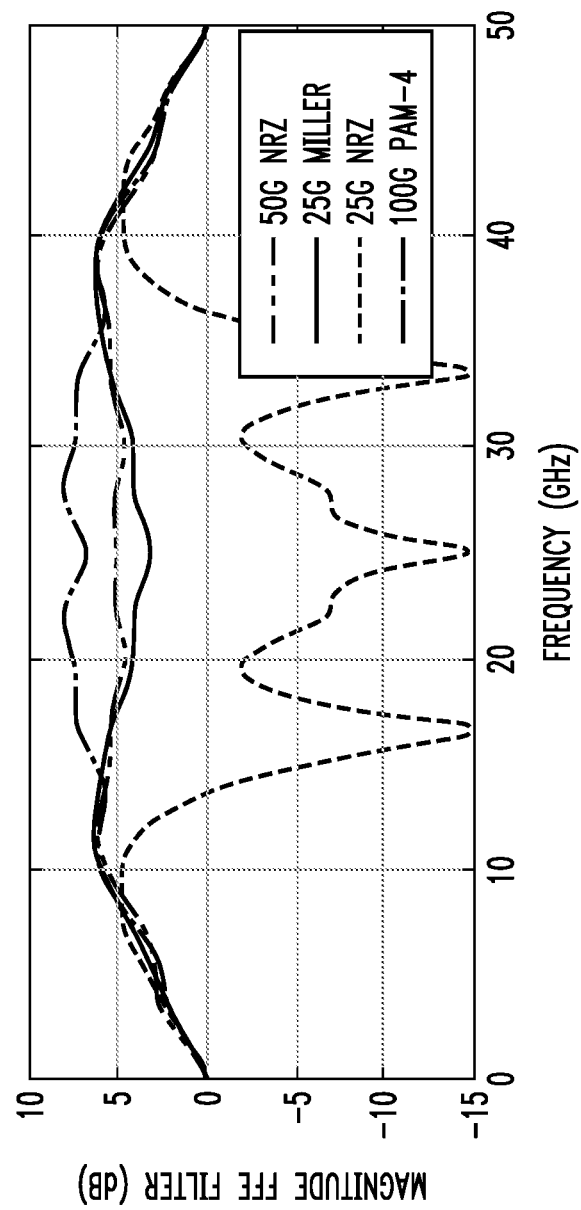
FIG. 5 is a graph of example equalizer filter settings for the various modulation formats as discussed above in association with FIGS. 3 and 4.

FIG. 5 is a frequency graph representation of an example equalizer filter settings for the various modulation schemes as discussed above in association with FIGS. 3 and 4. The monotonically increasing progression of the shape of the equalizer is evident here as the modulation scheme transitions through phases from an initial 25G NRZ to the 100G PAM4 mentioned above in association with the diagram of FIG. 4.

Figure 6:
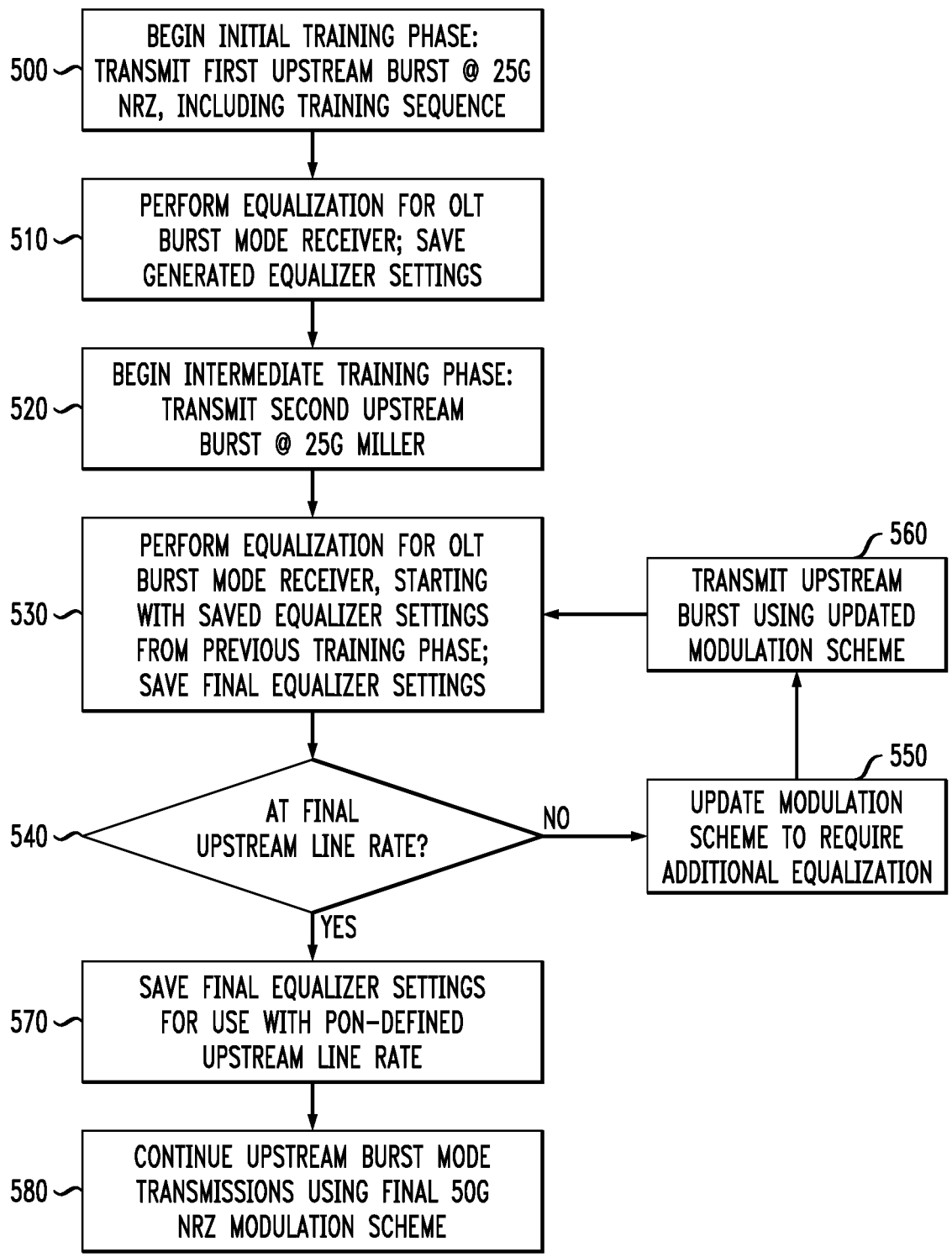
FIG. 6 is a flow chart summarizing an example of phased equalizer training as described above.

FIG. 6 is a flow chart summarizing the phased equalizer training as described above. An initial step 500 instructs the ONU to transmit an initial upstream burst using a simple modulation scheme (designated in this example as 25G NRZ), with a known training sequence included in the overhead portion of the burst. The following step (step 510), performed by the OLT burst mode receiver, is to train the receiver's equalizer based on the received training sequence. The next step is performed by the ONU (step 520), which is the transmission of an upstream burst using a different modulation scheme requiring an incremental increase in tap settings for the equalizer. In this example, 25G Miller encoding is given as an example of this different modulation scheme (the term "different" in accordance with the disclosed principles describing a modulation scheme requiring a higher level of equalization than the previously-used modulation scheme). Again, the OLT burst mode receiver performs equalizer training (step 530) based on the training sequence received in the 25G Miller upstream burst.

At this point, an inquiry may be made (step 540) to determine if the training process has been completed; that is, if the ONU is now using the PON-defined line rate in its upstream burst mode transmissions. If the response is "no", the process moves to step 550 and the ONU is instructed to again adjust its modulation scheme (i.e., increase the level of equalization required for decoding the transmitted data) for the next training phase. ONU then proceeds to transmit another upstream burst to the OLT burst mode receiver (step 560) and the process returns to step 530 to perform the next equalizer training process.

The phased process of updating the equalizer at the OLT burst mode receiver continues until the final PON-defined upstream burst mode modulation scheme has been through the training process (with an affirmative response at step 540), which then moves to step 570 with an instruction to save these final equalizer settings for proper handling and data recovery for subsequent upstream burst mode transmissions from the ONU (step 580).

Figure 7:
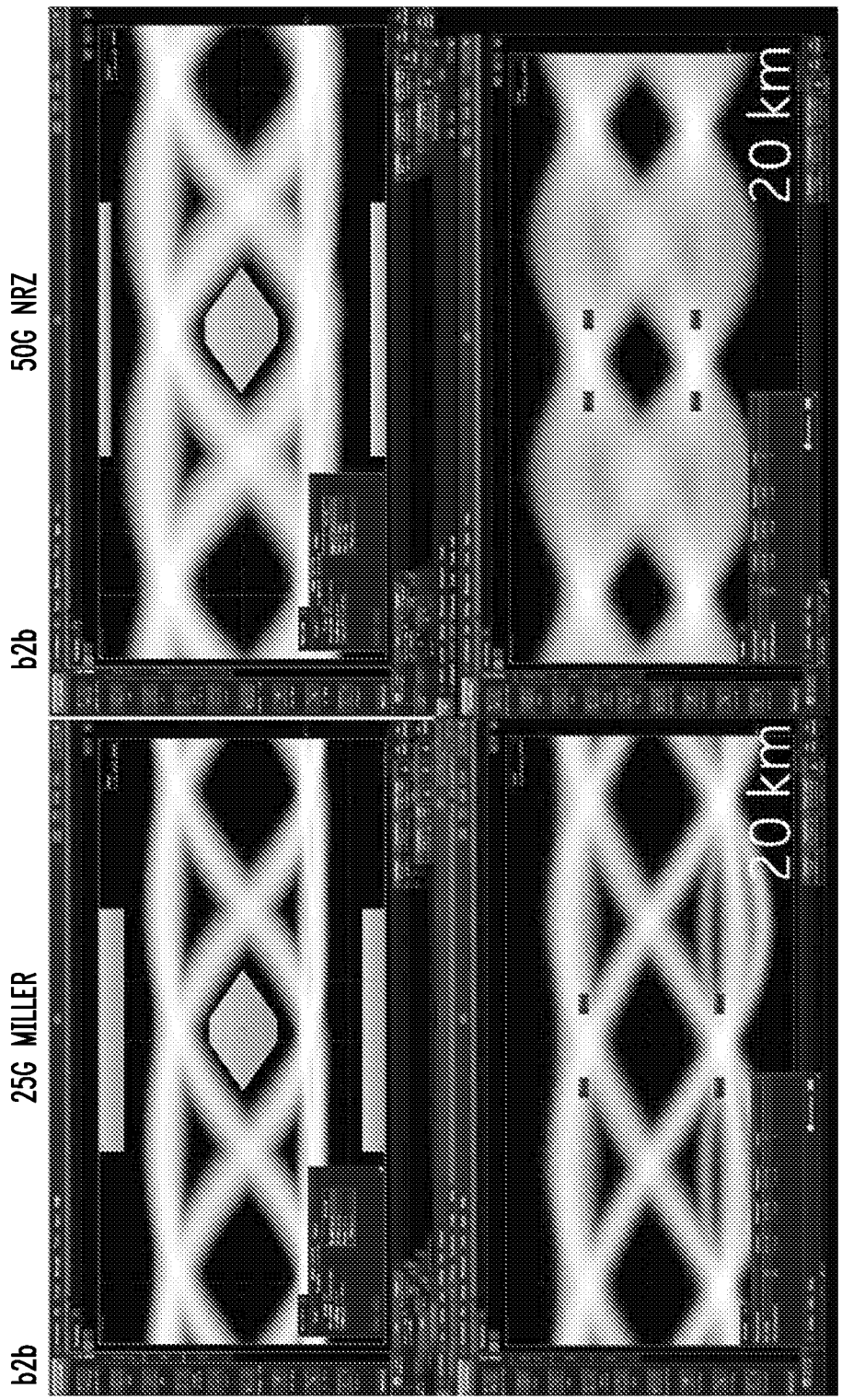
FIG. 7 contains eye diagrams of 25G Miller and 50G NRZ modulation formats.
Figure 8:
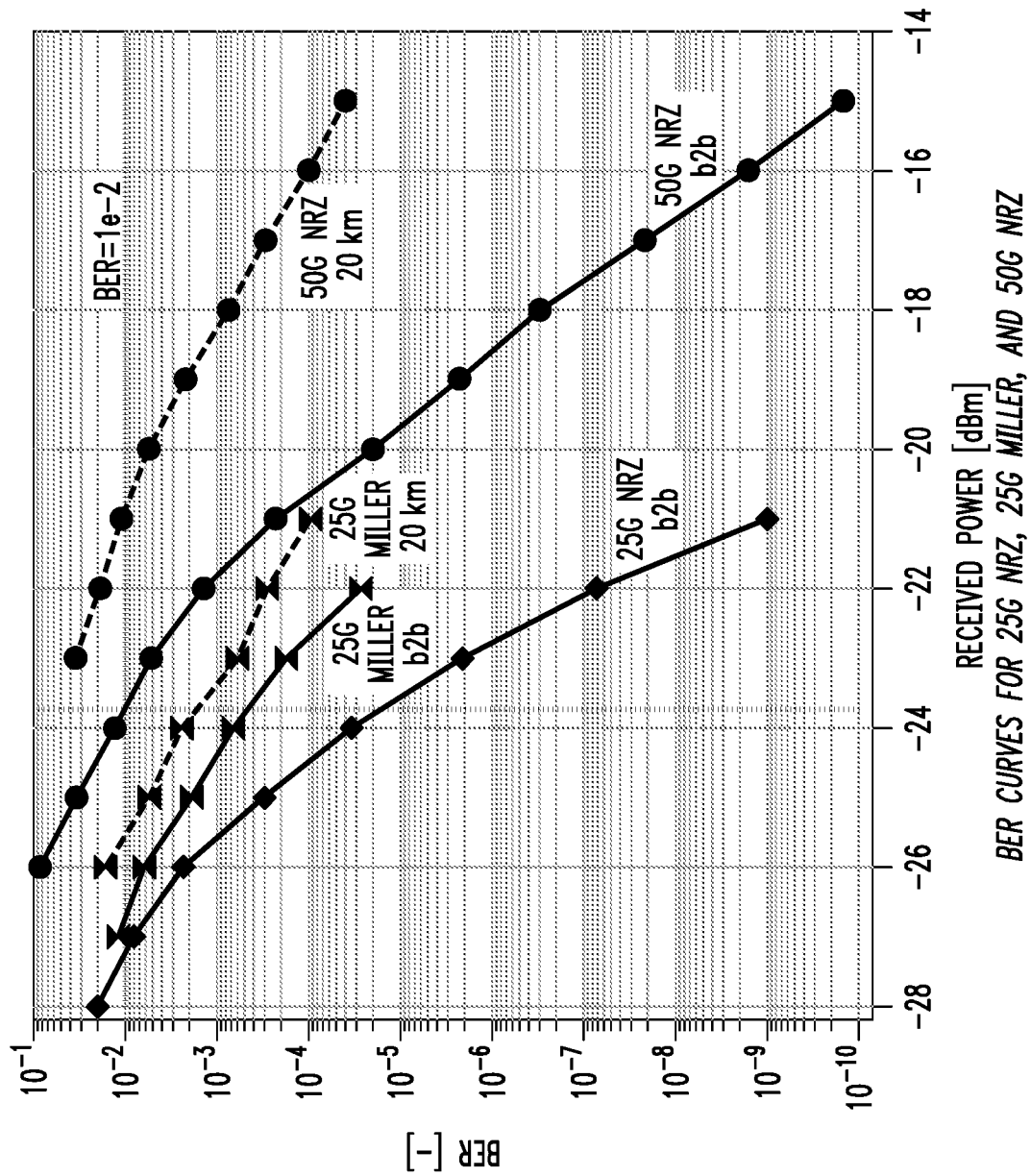
FIG. 8 plots BER curves for various modulation schemes, showing values for both back-to-back and after 20 km of fiber.

As mentioned above, an advantage of the disclosed phased approach is the ability to support the transmission of actual customer data that may be accurately recovered by the OLT burst mode receiver during the training process. In particular, receiver sensitivity to 25G line rates (as used in the initial and intermediate phases) is acceptable. These modulation schemes have better performance (as compared to 50G) with respect to receiver sensitivity and jitter tolerance. Further, even at minimal received power levels, 25G NRZ and 25G Miller bursts are easier to recover as a result of their excellent signal quality. Indeed, this signal quality may also result in overall faster equalizer training. FIG. 7 contains eye diagrams of 25G Miller and 50G NRZ As used in this application, the term "circuitry" may refer to one or more or all of the following:
 (a) hardware-only circuit implementations such as implementations in only analog and/or digital circuitry,
 (b) combinations of hardware circuits and software, such as (as applicable):
  (i) a combination of analog and/or digital hardware circuits(s) with software/firmware and
  (ii) any portions of hardware processor(s) with software (including digital signal processor(s)), software, and memory(ies) that work together to cause an apparatus, such as a mobile phone or server, to perform various functions), and (c) hardware circuit(s) and/or processor(s), such as microprocessor(s) or a portion of a microprocessor(s) that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

It will furthermore be understood that the terms "comprising" or "comprise" do not exclude other elements or steps, that the indefinite articles "a" or "an" do not exclude a plurality, and that a single element, such as a computer system, a processor, or another integrated unit may fulfill the functions of several means as recited in the claims. Any reference signs in the claims shall not be construed as limiting the respective claims concerned. The identifying terms "first", "second", "third", "a", "b", "c", and the like, when used in the description or the claims are introduced to distinguish between similar elements or steps and are not necessarily describing a sequential or chronological order. Similarly, the descriptive terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

When an element is referred to as being "connected" or "coupled" to another element, it can be directly connected or coupled to the other element, or intervening elements may be present. By contrast, when an element is specifically referred to as being "directly connected", or "directly coupled", to another element, there are no intervening elements present. Other words used to describe the relationship between elements should be interpreted in like fashion (e.g., "between" versus "directly between", "adjacent" versus "directly adjacent", and the like).

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

What is claimed is:

1. An apparatus, for use by an optical line terminal (OLT) in a passive optical network (PON) and communicatively connected to one or more optical network units (ONUs), the PON configured to support upstream burst mode transmissions from the ONUs at a defined high upstream line rate, the apparatus comprising:
   at least one memory including instructions;
   at least one processor configured to execute the instructions and cause the apparatus to perform phased training of an OLT burst mode receiver equalizer with respect to a new ONU, including:
      performing an initial phase of equalizer training based on a first upstream burst received from the new ONU, the first upstream burst transmitted using an initial low line rate modulation scheme, and the initial phase of equalizer training creating an initial group of equalizer settings;
      beginning with the initial group of equalizer settings, performing an intermediate phase of equalizer training based on one or more subsequently received upstream bursts from the new ONU transmitted using a different modulation scheme requiring additional receiver equalization, the intermediate phase of equalizer training creating an updated group of equalizer settings; and
      beginning with the updated group equalizer settings, performing a final phase of equalizer training based on a received upstream burst from the new ONU transmitted using a final modulation scheme based on the defined high upstream line rate, the final phase of equalizer training creating a final group of equalizer settings for continued use by the OLT burst mode receiver equalizer with the new ONU.

2. The apparatus according to claim 1, wherein the apparatus is caused to perform additional intermediate phases of equalizer training prior to the final phase of equalizer training, each additional intermediate phase based on a modulation scheme requiring an update to increase the equalization provided by the group of equalizer settings.

3. The apparatus according to claim 2, wherein the initial phase of equalizer training is based on a received 25G NRZ transmission from the new ONU, a first intermediate phase of equalizer training is based on a received 25G Miller-encoded transmission from the new ONU, a second intermediate phase of equalizer training is based on a received 50G NRZ transmission from the new ONU, and the final phase of equalizer training utilizes the defined upstream line rate of 100G, with a PAM 4 modulation format.

4. The apparatus according to claim 1, wherein the upstream burst mode transmission received during the intermediate phase of equalizer training utilizes the same line rate as the initial phase, with a different modulation format requiring additional equalization.

5. The apparatus according to claim 4, wherein the first upstream burst utilizes an NRZ modulation format and the subsequent upstream burst utilizes a Miller-encoded modulation format.

6. The apparatus according to claim 5, wherein the first upstream burst received by the OLT burst mode receiver during the initial phase of equalizer training utilizes 25G NRZ, and the subsequent upstream burst received by the OLT burst mode receiver during the intermediate phase of equalizer training utilizes 25G Miller encoding.

7. The apparatus according to claim 4, wherein the further upstream burst mode transmission received during the final phase of equalizer training utilizes the defined high upstream line rate, the apparatus creating a final group of equalizer settings for continued use by the OLT.

8. The apparatus according to claim 7, wherein the first upstream burst received by the OLT burst mode receiver during the initial phase of equalizer training utilizes 25G NRZ, and the subsequent upstream burst received by the OLT burst mode receiver during the intermediate phase of equalizer training utilizes 25G Miller encoding, and the further upstream burst received by the OLT burst mode receiver during the final phase of equalizer training utilizes 50G NRZ.

9. An apparatus, for use by an ONU operating in a PON supporting burst mode upstream transmissions at a defined high upstream line rate, the ONU communicatively connected an OLT burst mode receiver and the apparatus comprising:
  at least one memory including instructions;
  at least one processor configured to execute the instructions and cause the ONU apparatus to perform phased training of an OLT burst mode receiver equalizer based on a sequence of burst mode transmissions from the ONU, including:
    defining an initial modulation format for use in a first burst mode upstream transmission to the OLT burst mode receiver, the defined initial modulation format based on an initial low line rate modulation scheme, with the first burst mode transmission including a training sequence in an overhead portion of the transmission;
    transmitting the first burst mode transmission to the OLT burst mode receiver for performing an initial phase of receiver equalizing training;
    updating the modulation scheme of a subsequent burst mode transmission to a modulation scheme requiring additional equalization at the OLT receiver;
    transmitting the subsequent burst mode transmission to the OLT receiver for performing an intermediate phase of receiver equalizing training;
    updating the modulation scheme of a further burst mode transmission to the defined high line rate modulation scheme supported by the PON and requiring additional equalization at the OLT receiver; and
    transmitting the further burst mode transmission to the OLT receiver for performing a final phase of receiver equalizing training.

10. The apparatus according to claim 9, wherein the apparatus is caused to perform addition steps of updating the modulation scheme and transmitting subsequent burst mode communications prior to updating the modulation scheme to the defined high line rate modulation scheme supported by the PON.

11. The apparatus according to claim 9, wherein the ONU is instructed to use a modulation scheme utilized during a previous activation process as the initial low line rate modulation scheme.

12. The apparatus according to claim 9, wherein the further upstream burst transmitted by the ONU during the final phase of equalizer training utilizes a modulation scheme based on the defined high upstream line rate supported by the PON.

13. A method, for use by an OLT communicatively connected to a plurality of ONUs within a PON, with one or more high-rate ONUs operating at a predefined high upstream line rate, comprising:
  during a phased process for training an OLT burst mode receiver equalizer to accurately recover data transmitted by a new ONU,
  performing an initial phase of equalizer training based on a first upstream burst received from the new ONU, the first upstream burst transmitted using an initial low line rate modulation scheme, and the initial phase of equalizer training creating an initial group of equalizer settings;
  beginning with the initial group of equalizer settings, performing an intermediate phase of equalizer training based on one or more subsequently received upstream bursts from the new ONU transmitted using a different modulation scheme requiring additional receiver equalization, the intermediate phase of equalizer training creating an updated group of equalizer settings; and
  beginning with the updated group equalizer settings, performing a final phase of equalizer training based on a received upstream burst from the new ONU transmitted using a final modulation scheme based on the defined high upstream line rate, the final phase of equalizer training creating a final group of equalizer settings for continued use by the OLT burst mode receiver equalizer with the new ONU.

14. The method of claim 13, wherein the initial phase of equalizer training is based on at least one received upstream burst mode transmission from the ONU.

15. The method of claim 13, wherein the intermediate phase of equalizer training is based on at least one received upstream burst mode transmission from the ONU.

16. The method of claim 13, wherein prior to performing the final phase of equalizer training, an additional intermediate phase of equalizer training is performed to incrementally increase the equalizer settings prior to receiving a further burst mode transmission at the defined high line rate supported by the PON.

17. The method of claim 13, wherein the initial phase of equalizer training is based on a upstream burst transmitted using a 25G NRZ modulation scheme.

18. The method of claim 13 wherein the final phase of equalizer training is based on one or more upstream bursts transmitted at a defined high line rate of 50G NRZ.

19. The method of claim 13, wherein the final phase of equalizer training is based on one or more upstream bursts transmitted at a defined high line rate of 100G PAM.

20. A method, for use by an ONU communicatively connected to an OLT in a PON supporting a defined high line rate upstream burst mode transmission, comprising:
  during a phased process for training an OLT burst mode receiver equalizer to accurately recover data transmitted by the ONU,
  defining an initial modulation format for use in a first burst mode upstream transmission to the OLT burst mode receiver, the defined initial modulation format based on an initial low line rate modulation scheme, with the first burst mode transmission including a training sequence in an overhead portion of the transmission;
  transmitting the first burst mode transmission to the OLT burst mode receiver for performing an initial phase of receiver equalizing training;
  updating the modulation scheme of a subsequent burst mode transmission to a modulation scheme requiring additional equalization at the OLT receiver;
  transmitting the subsequent burst mode transmission to the OLT receiver for performing an intermediate phase of receiver equalizing training;
  updating the modulation scheme of a further burst mode transmission to the defined high line rate modulation scheme supported by the PON and requiring additional equalization at the OLT receiver; and transmitting the further burst mode transmission to the OLT receiver for performing a final phase of receiver equalizing training.

\* \* \* \* \*